(12) United States Patent
Kuroda (10) Patent No.: US 8,467,256 B2
(45) Date of Patent: Jun. 18, 2013

(54) ELECTRONIC CIRCUIT

(75) Inventor: Tadahiro Kuroda, Kanagawa (JP)

(73) Assignee: Keio University, Tokyo (JP)

( * ) Notice: Subject to any disclaimer, the term of this patent is extended or adjusted under 35 U.S.C. 154(b) by 183 days.

(21) Appl. No.: 12/998,996

(22) PCT Filed: Dec. 2, 2009

(86) PCT No.: PCT/JP2009/070256
§ 371 (c)(1),
(2), (4) Date: Jun. 22, 2011

(87) PCT Pub. No.: WO2010/073884
PCT Pub. Date: Jul. 1, 2010

(65) Prior Publication Data
US 2011/0255352 A1    Oct. 20, 2011

(30) Foreign Application Priority Data

Dec. 26, 2008   (JP) .................................. 2008-333107

(51) Int. Cl.
*G11C 7/00*      (2006.01)

(52) U.S. Cl.
USPC ............................ 365/191; 365/206; 235/487

(58) Field of Classification Search
USPC .................................. 365/191, 206; 235/487
See application file for complete search history.

(56) References Cited

U.S. PATENT DOCUMENTS

| | | | |
|---|---|---|---|
| 5,701,037 A | 12/1997 | Weber et al. | |
| 8,276,822 B2 * | 10/2012 | Kuroda | 235/487 |
| 2006/0176624 A1 | 8/2006 | Kuroda et al. | |
| 2006/0176676 A1 | 8/2006 | Kuroda et al. | |
| 2007/0069382 A1 | 3/2007 | Kusumoto et al. | |
| 2007/0274198 A1 | 11/2007 | Kuroda et al. | |

(Continued)

FOREIGN PATENT DOCUMENTS

| | | |
|---|---|---|
| JP | 08-236696 A | 9/1996 |
| JP | 2005-228981 A | 8/2005 |

(Continued)

OTHER PUBLICATIONS

D. Mizoguchi et al., "A 1.2Gb/s/pin Wireless Superconnect based on Inductive Inter-chip Signaling (IIs)," IEEE International Solid-State Circuits Conference (ISSCC'04), Dig. Tech Papers, pp. 142-143, 517, Feb. 2004.

(Continued)

*Primary Examiner* — Huan Hoang
(74) *Attorney, Agent, or Firm* — Rader, Fishman & Grauer PLLC (57) ABSTRACT

An electronic circuit for which a coil 22 is disposed overlapping with a memory array region to carry out communications by inductive coupling between stacked and mounted chips by the coil 22. Because intersections 1 and 2 between the coil 22 and a bit line 15 are located at a pair of positions that are equal to each other in wiring length from both terminals a and g of the coil 22, interference from the bit line 15 to the coil 22 results in the same phase and same amplitude at both ends of the coil 22, and can thus be eliminated by a differential amplifier. Thereby, a coil antenna can be disposed so that, even when a coil antenna to carry out communications by inductive coupling is disposed overlapping with a memory array region, little interference occurs from a memory array wiring to communications by the coil antenna.

7 Claims, 13 Drawing Sheets

U.S. PATENT DOCUMENTS

| | | |
|---|---|---|
| 2007/0289772 A1 | 12/2007 | Kuroda et al. |
| 2008/0258744 A1 | 10/2008 | Kuroda et al. |
| 2009/0057039 A1 | 3/2009 | Kuroda et al. |
| 2009/0196312 A1 | 8/2009 | Kuroda |
| 2009/0267848 A1 | 10/2009 | Kuroda |
| 2010/0328989 A1* | 12/2010 | Yamazaki ................ 365/151 |
| 2011/0039493 A1 | 2/2011 | Kuroda |

FOREIGN PATENT DOCUMENTS

| | | |
|---|---|---|
| JP | 2005-348264 A | 12/2005 |
| JP | 2006-50254 A | 2/2006 |
| JP | 2006-55454 A | 3/2006 |
| JP | 2006-105630 A | 4/2006 |
| JP | 2006-173415 A | 6/2006 |
| JP | 2006-173986 A | 6/2006 |
| JP | 2007-35797 A | 2/2007 |
| JP | 2007-122690 A | 5/2007 |
| JP | 2008-67288 A | 3/2008 |
| JP | 2009-188368 A | 8/2009 |
| JP | 2009-266109 A | 11/2009 |
| JP | 2009-295699 A | 12/2009 |
| WO | WO-2009/069532 A1 | 6/2009 |

OTHER PUBLICATIONS

N. Miura et al., "Analysis and Design of Transceiver Circuit and Inductor Layout for Inductive Inter-chip Wireless Superconnect," Symposium on VLSI Circuits, Dig. Tech. Papers, pp. 246-249, Jun. 2004.

N. Miura et al., "Cross Talk Countermeasures in Inductive Inter-Chip Wireless Superconnect," in Proc. IEEE Custom Integrated Circuits Conference (CICC'04), pp. 99-102, Oct. 2004.

International Search Report mailed on Jan. 12, 2010.

* cited by examiner

Received data

ELECTRONIC CIRCUIT

TECHNICAL FIELD

The present invention relates to an electronic circuit capable of suitably carrying out communications between chips such as IC (Integrated Circuit) bare chips to be stacked and mounted.

BACKGROUND ART

The present inventors have proposed an electronic circuit that carries out communications by inductive coupling between chips to be stacked and mounted via coils formed by on-chip wiring of LSI (Large Scale Integration) chips (refer to Patent Literatures 1 to 11, and Non Patent Literatures 1 to 3).

Particularly, in Patent Literature 10, the present inventors have focused on the point that a rarely used metal wiring layer exists among metal wiring layers in a memory array region, and proposed disposing coils efficiently by forming coils using the conventionally unused metal wiring layer.

Figure 13A:
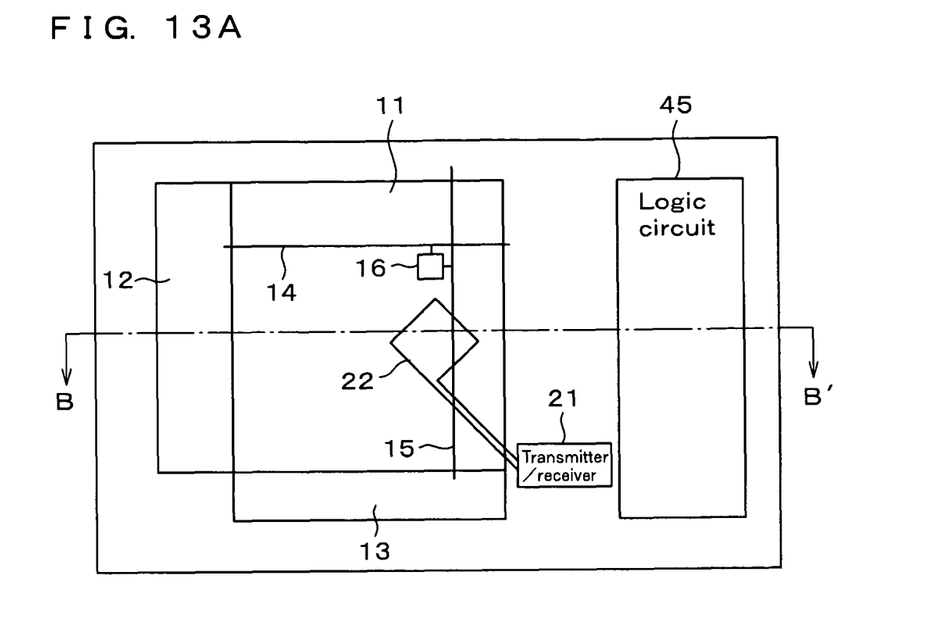
FIG. 13A and FIG. 13B are views depicting a configuration of an electronic circuit proposed in Patent Literature 10.
Figure 13B:
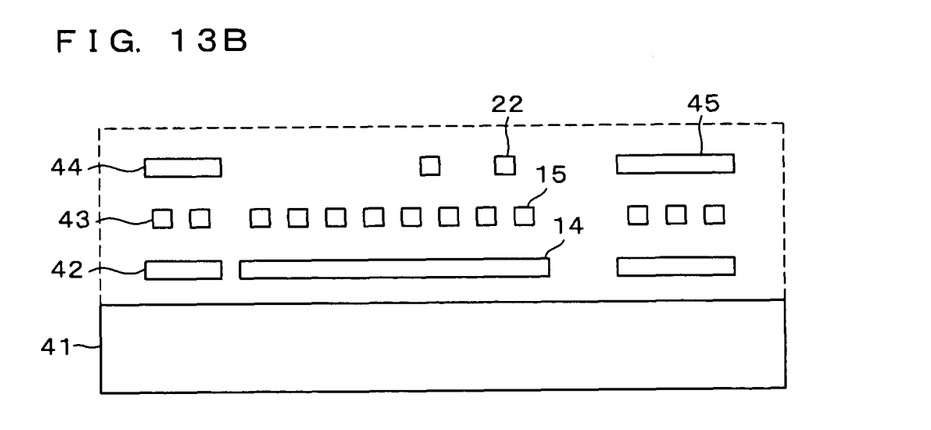

FIG. 13A and FIG. 13B are views depicting a configuration of an electronic circuit proposed in Patent Literature 10. FIG. 13A is a plan view, and FIG. 13B is a sectional view taken along a line BB' of FIG. 13A. The figures depict one LSI chip in an electronic circuit to be stacked and mounted. The LSI chip is composed of a memory array 11, a peripheral circuit 12 being, for example, a decoder, and a peripheral circuit 13 being, for example, a sense amplifier. In the memory array 11, many word lines 14 and bit lines 15 are disposed at a high density, and memory cells 16 are disposed at intersections thereof. The word lines 14 select memory cell lines, and the bit lines 15 write or read out signals. The figure depicts one each of the word lines 14, the bit lines 15, and the memory cells 16. In a region of the memory array 11, a coil 22 connected to a transmitter/receiver 21 and for carrying out communications by inductive coupling is disposed. The coil 22 is formed by a metal wiring layer different from that for the word lines 14 and the bit lines 15. At that time, the shape of the coil 22 is provided as a polygonal shape, here, for example, a square shape, and each side thereof is disposed so as not to be parallel to the word lines 14 and the bit lines 15. This allows minimizing capacitive coupling and magnetic field coupling between the coil 22 and the word lines 14 and bit lines 15.

The figures depict a standard LSI chip having the memory array 11 and a logic circuit 45, for which three metal wiring layers 42 to 44 are stacked upon a semiconductor substrate 41. The metal wiring layer 42 of a first layer forms the word line 14, the metal wiring layer 43 of a second layer forms the bit line 15, and the metal wiring layer 44 of a third layer forms the coil 22. Although three or more metal wiring layers are used for the peripheral circuit 12, 13 and the logic circuit 45, only two layers are mostly used for the memory array 11, and thus an unused metal wiring layer in its region is used to form the coil 22.

CITATION LIST

Patent Literature

[Patent Literature 1] JP 2005-228981 A
[Patent Literature 2] JP 2005-348264 A
[Patent Literature 3] JP 2006-050354 A
[Patent Literature 4] JP 2006-066454 A
[Patent Literature 5] JP 2006-105630 A
[Patent Literature 6] JP 2006-173986 A
[Patent Literature 7] JP 2006-173415 A
[Patent Literature 8] WO 2009/069532 A1
[Patent Literature 9] JP 2009-188468 A
[Patent Literature 10] JP 2009-266109 A
[Patent Literature 11] Japanese Patent Application No. 2008-146248 (filed on Jun. 3, 2008)

Non Patent Literature

[Non Patent Literature 1] D. Mizoguchi et al, "A 1.2 Gb/s/pin Wireless Superconnect based on Inductive Inter-chip Signaling (IIS)," IEEE International Solid-State Circuits Conference (ISSCC '04), Dig. Tech. Papers, pp. 142-143, 517, February 2004.

[Non Patent Literature 2] N. Miura et al, "Analysis and Design of Transceiver Circuit and Inductor Layout for Inductive Inter-chip Wireless Superconnect," Symposium on VLSI Circuits, Dig. Tech. Papers, pp. 246-249, June 2004.

[Non Patent Literature 3] N. Miura et al, "Cross Talk Countermeasures in Inductive Inter-Chip Wireless Superconnect," in Proc. IEEE Custom Integrated Circuits Conference (CICC '04), pp. 99-102, October 2004.

SUMMARY OF INVENTION

Technical Problem

However, when a coil to carry out communications by inductive coupling is disposed overlapping with a memory array region, because a signal of the memory array wiring interferes with the coil, the SN ratio is deteriorated in communications through the coil. Moreover, because a signal of the coil interferes with the memory array wiring conversely, the reliability in writing or reading of the memory is reduced.

In view of the above-described problems, it is an object of the present invention to provide an electronic circuit for which a coil antenna is disposed so that, even when a coil antenna to carry out communications by inductive coupling is disposed overlapping with a memory array region, little interference occurs between a memory array wiring and communications by the coil antenna.

Solution to Problem

An electronic circuit according to a first aspect of the present invention includes, on a substrate, a memory array for storing information, and a coil antenna formed by a metal wiring layer being overlapped with a region where said memory array exists, wherein positions where a wiring formed by a metal wiring layer adjacent to the metal wiring layer that forms the coil antenna thereover or thereunder and the coil antenna intersect with each other on a plan view consist of a pair of positions that are equal to each other in wiring length from both terminals of the coil antenna.

Moreover, in an electronic circuit according to a second aspect of the present invention, the wiring that intersects with the coil antenna is a bit line, word line, or column selecting line of the memory array.

Moreover, in an electronic circuit according to a third aspect of the present invention, a differential amplifier that amplifies a signal received by said coil antenna is connected to the coil antenna.

Moreover, an electronic circuit according to a fourth aspect of the present invention comprises a transmitter that is connected to the coil antenna, and drives a current flowing to said coil antenna in accordance with transmission data while holding potential at a center of said coil antenna at a predetermined potential.

Advantageous Effects of Invention

According to the present invention, even when a coil antenna to carry out communications by inductive coupling is disposed overlapping with a memory array region, interference from memory array wiring to the coil antenna results in the same phase and same amplitude at both ends of the coil antenna, and can thus be eliminated by a differential amplifier. Moreover, a signal of the coil antenna can be inhibited from interfering with the memory array wiring conversely.

DESCRIPTION OF EMBODIMENTS

Hereinafter, preferred embodiments of the present invention will be described in detail with reference to the accompanying drawings.

Figures 2A, 2B:
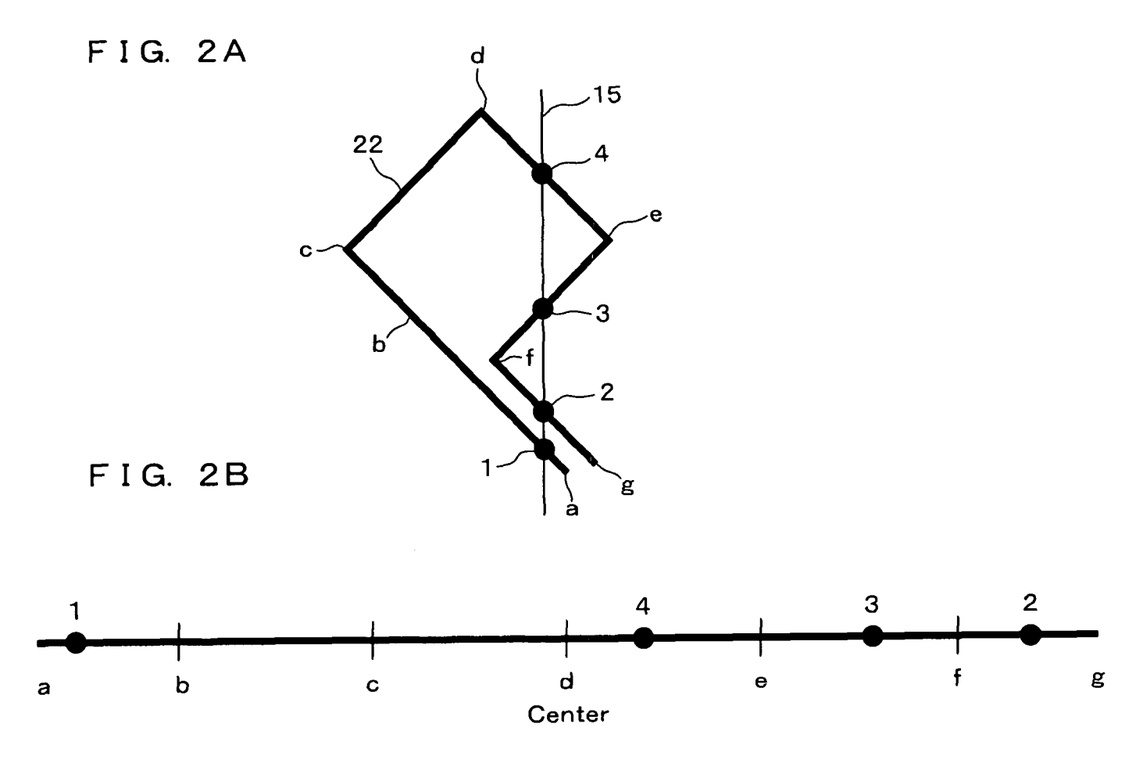
FIG. 2A and FIG. 2B are views depicting a relationship between a coil antenna and a memory array wiring proposed in Patent Literature 1.

FIG. 2A and FIG. 2B are views depicting a relationship between a coil antenna and a memory array wiring proposed in Patent Literature 1. FIG. 2A is a plan view depicting a relationship between the coil antenna and the memory array wiring, and FIG. 2B is a view depicting the coil antenna when extended. Reference signs a, b, c, d, e, f, g, 1, 2, 3, and 4 of FIG. 2A and reference signs a, b, c, d, e, f, g, 1, 2, 3, and 4 of FIG. 2B indicate corresponding positions of a coil 22. As shown in FIG. 13, the bit line 15 is formed by the second metal wiring layer 43, and the coil 22 is formed by the third metal wiring layer 44. Although not shown in FIG. 2, the word line 14 is formed by the first metal wiring layer 42, a column selecting line may further be disposed, and in this case, the column selecting line is formed by the second metal wiring layer 43 and disposed.

Here, interference from the memory array wiring to the coil antenna will be considered. Between the word lines 14 of the first layer and the coils 22 of the third layer, because an electric field between both layers is cut off due to the existence of the bit lines 15 of the second layer disposed at a high density, relatively little interference noise is generated from the word lines 14 to the coils 22. The bit lines 15 of the second layer closest to the coils 22 of the third layer are dominant as the cause of interference noise with the coils 22.

In FIG. 2, when a voltage signal that changes from 'Low' to 'High' is generated in the bit line 15, for example, also at intersections 1, 2, 3, and 4 on the coil 22, a voltage signal that changes from 'Low' to 'High' is generated as noise in capacitive coupling. Because the intersections 1 and 2 are located at a pair of positions that are equal to each other in wiring length from two terminals a and g of the coil 22, noise to be generated at these positions results in the same phase and same amplitude of noise at the two terminals a and g of the coil 22, and can be eliminated, in a receiver connected to the two terminals a and g of the coil 22, by a differential amplifier. However, noise superimposed at the intersections 3 and 4 not located at a pair of positions that are equal to each other in wiring length from both terminals of the coil 22 results in, in consideration of inductance, parasitic capacitance, and resistance components of the coil 22, different amplitudes of noise that reach the two terminals a and g of the coil 22 at different times, and this noise cannot be eliminated by the differential amplifier. As a result, the SN ratio of the receiver is deteriorated, which can cause a higher possibility of malfunction.

Example 1

Figure 1A:
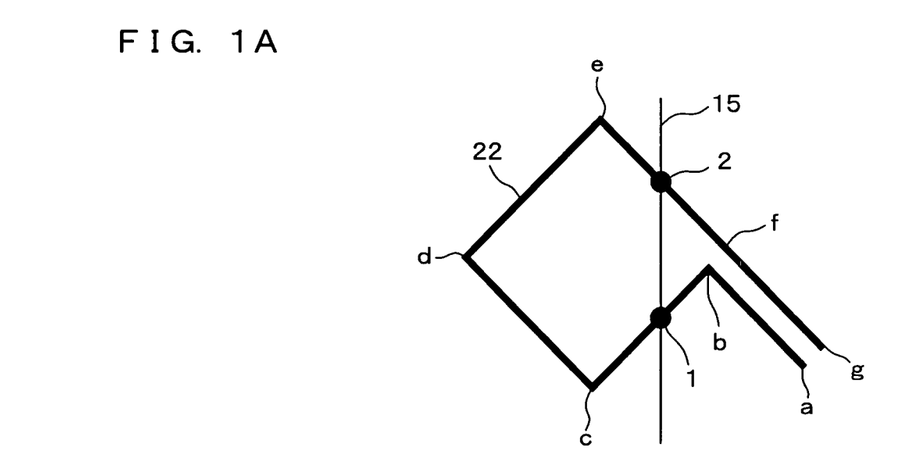
FIG. 1A and FIG. 1B are views depicting a relationship between a coil antenna and a memory array wiring according to Example 1 of the present invention.
Figure 1B:
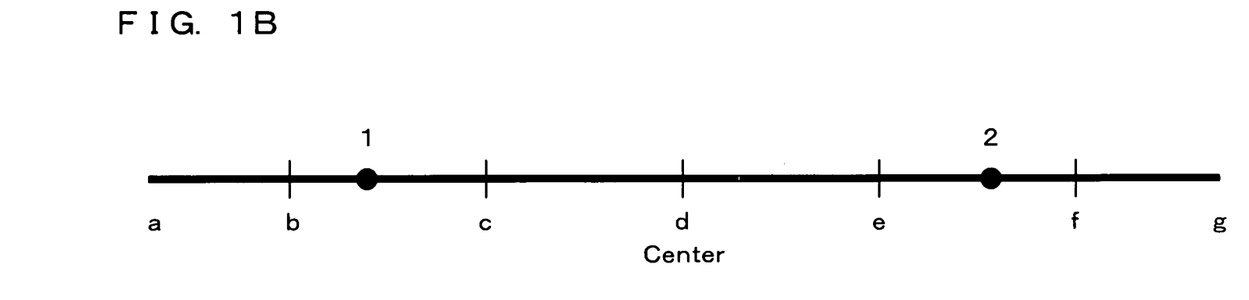

FIG. 1A and FIG. 1B are views depicting a relationship between a coil antenna and a memory array wiring according to Example 1 of the present invention. FIG. 1A is a plan view depicting a relationship between the coil antenna and the memory array wiring, and FIG. 1B is a view depicting the coil antenna when extended. Reference signs a, b, c, d, e, f, g, 1, and 2 of FIG. 1A and reference signs a, b, c, d, e, f, g, 1, and 2 of FIG. 1B indicate corresponding positions of a coil 22. For the present example, the coil 22 is disposed so that intersections 1 and 2 where the bit line 15 being a wiring of the wiring layer closest to the wiring layer that forms the coil 22 intersects with the coil 22 on the plan view are located at a pair of positions that are equal to each other in wiring length from both terminals of the coil 22. Many bit lines 15 are disposed at a high density, but for any of the bit lines 15, intersections with the coil 22 are located at a pair of positions that are equal to each other in wiring length from both terminals of the coil 22. Therefore, noise to be generated at these positions results in the same phase and same amplitude of noise at the two terminals a and g of the coil 22, and can be eliminated, in a receiver connected to the two terminals a and g of the coil 22, by a differential amplifier.

It can be confirmed by a simulation that differential noise of 0.6 mV is generated at both ends of the coil in the case of FIG. 2, while the differential noise is reduced to 0.1 mV in the case of FIG. 1.

Figure 3:
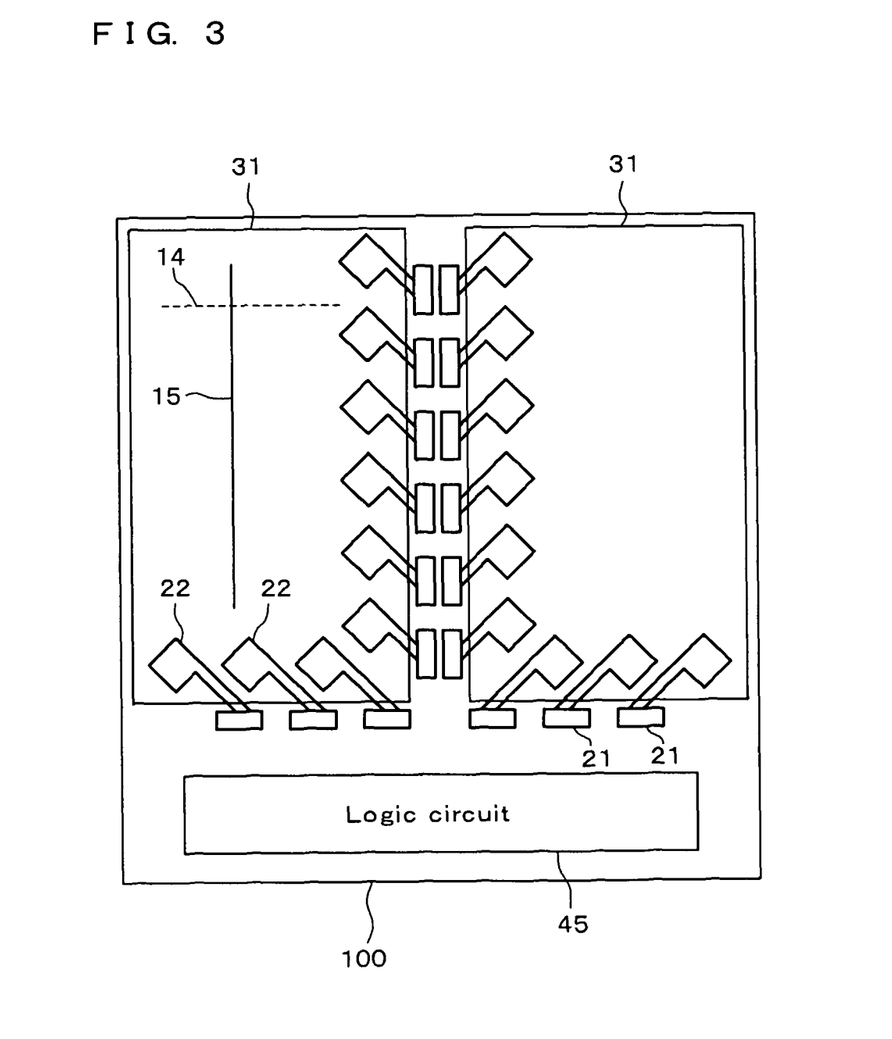
FIG. 3 is a plan view depicting an overall structure of an electronic circuit according to Example 1 of the present invention.

(Simulation Conditions)
Length of one side of coil: 260 μm
Winding number: one
Coil wire width: 1.6 μm
Coil wire interval: 1.6 μm
Bit line length: 1 mm
Rise time of bit line signal: 150 ps FIG. 3 is a plan view depicting an overall structure of an electronic circuit according to Example 1 of the present invention. A chip 100 is shown here as an example of the electronic circuit. The chip 100 is composed of transmitter/receivers 21, coils 22, memory arrays 31 including word lines 14 and bit lines 15, and a logic circuit 45.

Figure 5A:
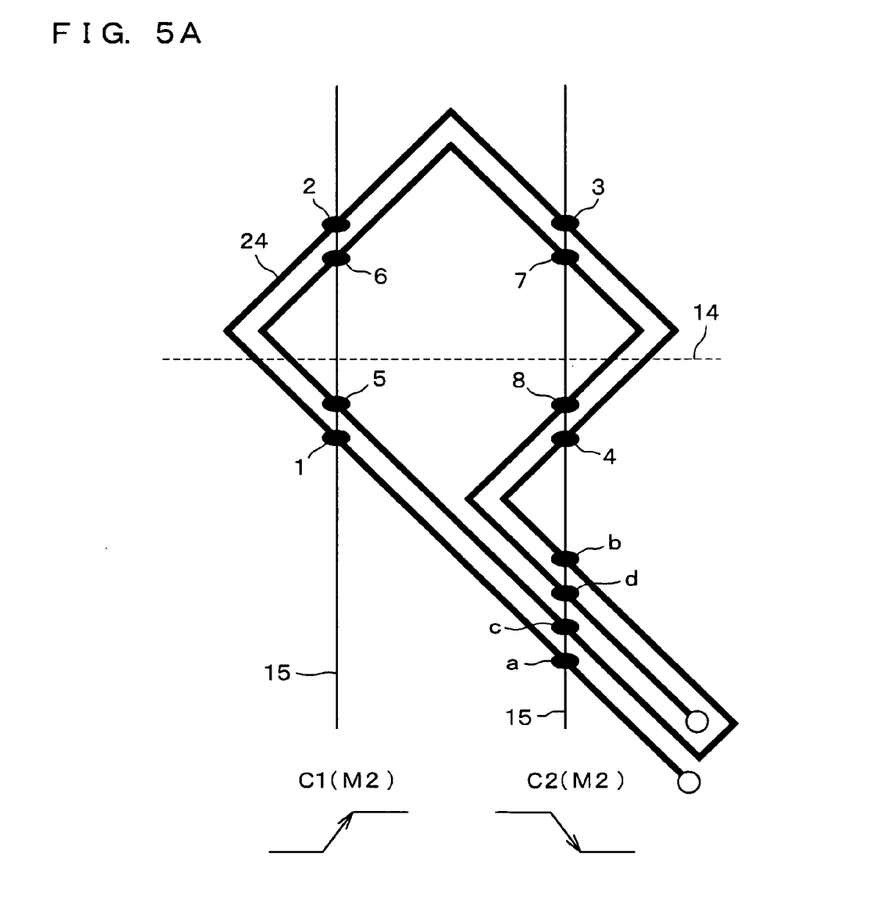
FIG. 5A and FIG. 5B are views depicting another relationship between a coil antenna and a memory array wiring not according to the present invention.
Figure 5B:
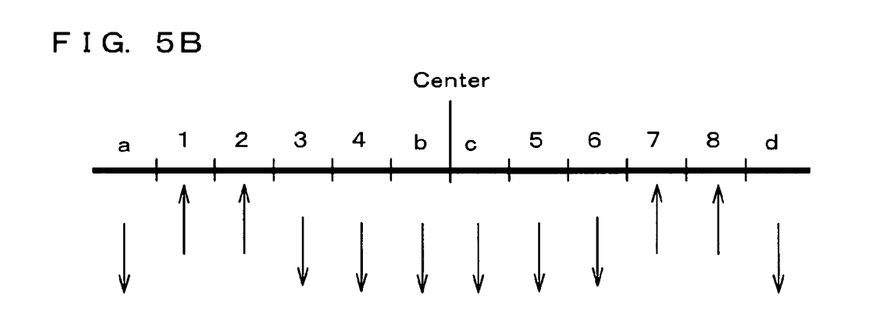

FIG. 5A and FIG. 5B are views depicting another relationship between a coil antenna and a memory array wiring not according to the present invention. FIG. 5A is a plan view depicting a relationship between the coil antenna and the memory array wiring, and FIG. 5B is a view depicting the coil antenna when extended. Reference signs a, b, c, d, 1, 2, 3, 4, 5, 6, 7, and 8 of FIG. 5A and reference signs a, b, c, d, 1, 2, 3, 4, 5, 6, 7, and 8 of FIG. 2B indicate corresponding positions of a coil 24. This example shows a case where the coil was wound two times. Because intersections 1, 2, 5, and 6 and intersections a, b, c, d, 3, 4, 7, and 8 between the bit lines 15 and the coil 24 do not consist of pairs of positions that are equal to each other in wiring length from both terminals of the coil 24, interference noise from the bit line 15 with respect to the coil 24 results in different amplitudes of noise at both ends of the coil 24, and this noise cannot be eliminated by a differential amplifier.

Example 2

Figure 4A:
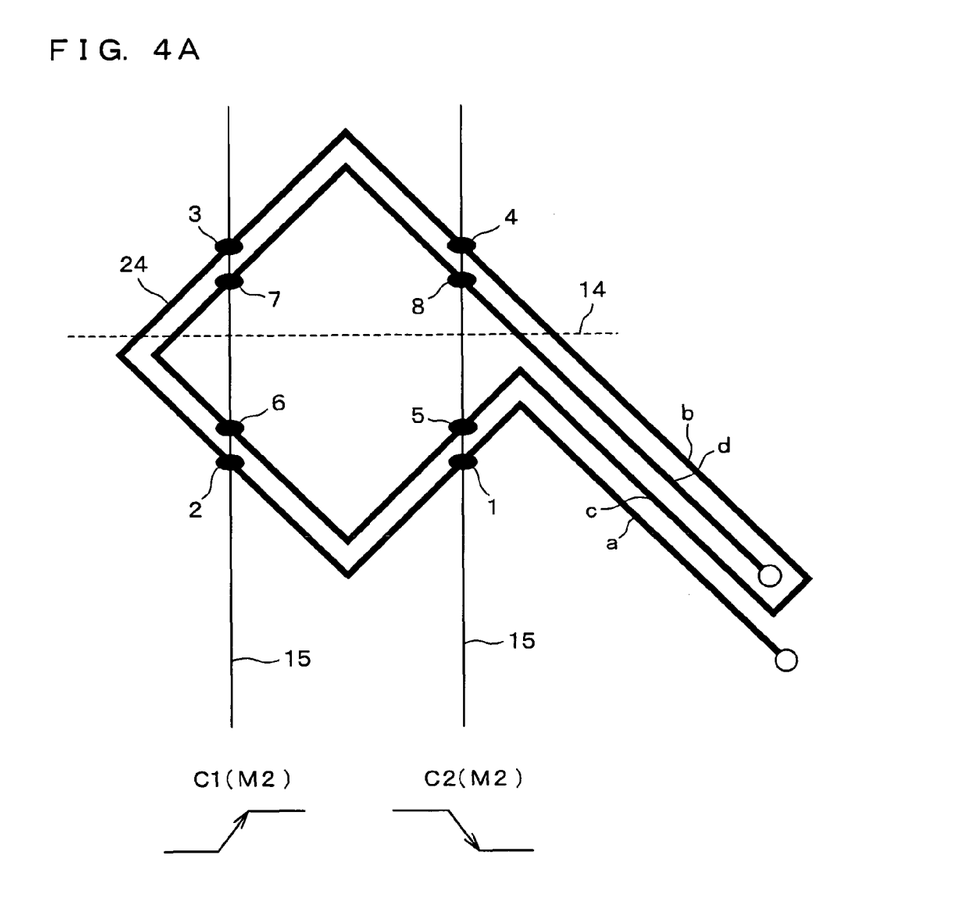
FIG. 4A and FIG. 4B are views depicting a relationship between a coil antenna and a memory array wiring according to Example 2 of the present invention.
Figure 4B:
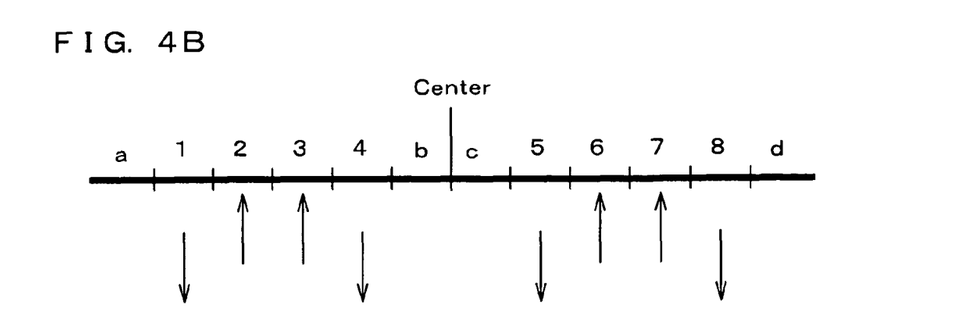

FIG. 4A and FIG. 4B are views depicting a relationship between a coil antenna and a memory array wiring according to Example 2 of the present invention. FIG. 4A is a plan view depicting a relationship between the coil antenna and the memory array wiring, and FIG. 4B is a view depicting the coil antenna when extended. Reference signs a, b, c, d, 1, 2, 3, 4, 5, 6, 7, and 8 of FIG. 4A and reference signs a, b, c, d, 1, 2, 3, 4, 5, 6, 7, and 8 of FIG. 4B indicate corresponding positions of a coil 24. This example shows a case where the coil was wound two times. Because intersections 2, 3, 6, and 7 and intersections 1, 4, 5, and 8 between the bit line 15 and the coil 24 consist of pairs of positions that are equal to each other in wiring length from both terminals of the coil 24, interference noise from the bit line 15 with respect to the coil 24 results in the same phase and same amplitude of noise at both ends of the coil 24, and this noise can be eliminated by a differential amplifier.

Figure 7A:
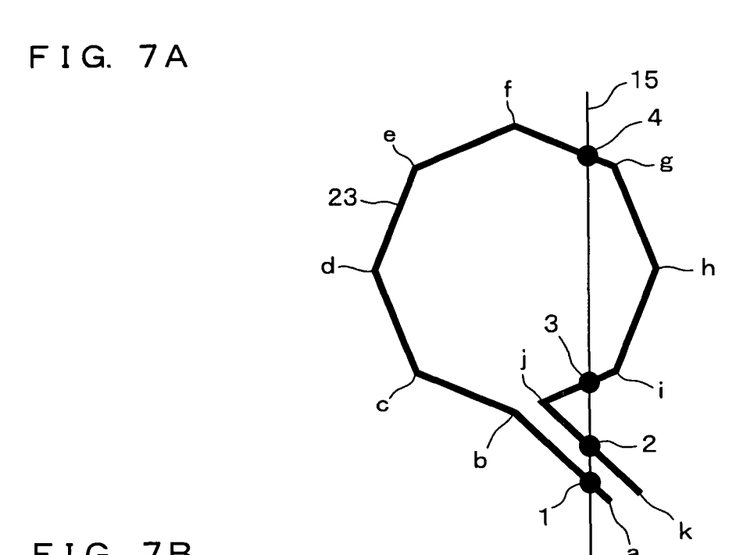
FIG. 7A and FIG. 7B are views depicting another relationship between a coil antenna and a memory array wiring not according to the present invention.
Figure 7B:
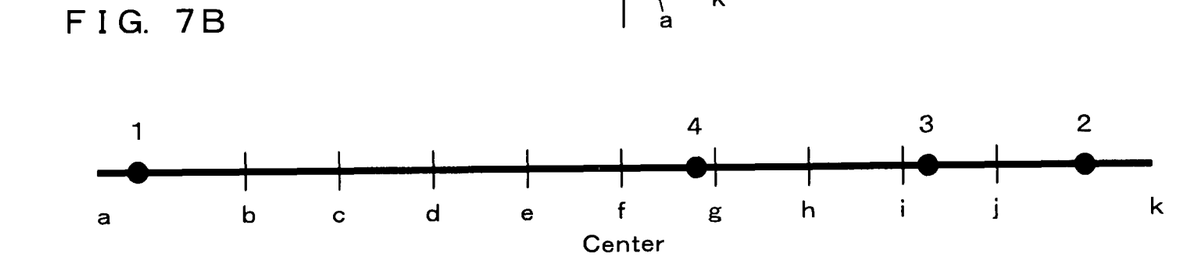

FIG. 7A and FIG. 7B are views depicting another relationship between a coil antenna and a memory array wiring not according to the present invention. FIG. 7A is a plan view depicting a relationship between the coil antenna and the memory array wiring, and FIG. 7B is a view depicting the coil antenna when extended. Reference signs a, b, c, d, e, f, g, h, i, j, k, 1, 2, 3, and 4 of FIG. 7A and reference signs a, b, c, d, e, f, g, h, i, j, k, 1, 2, 3, and 4 of FIG. 7B indicate corresponding positions of a coil 23. This example shows a case where the coil was formed in an octagonal shape. Because intersections 1, 2, 3, and 4 between the bit line 15 and the coil 23 do not consist of pairs of positions that are equal to each other in wiring length from both terminals of the coil 23, interference noise from the bit line 15 with respect to the coil 23 results in different amplitudes of noise at both ends of the coil 23, and this noise cannot be eliminated by a differential amplifier.

Example 3

Figure 6A:
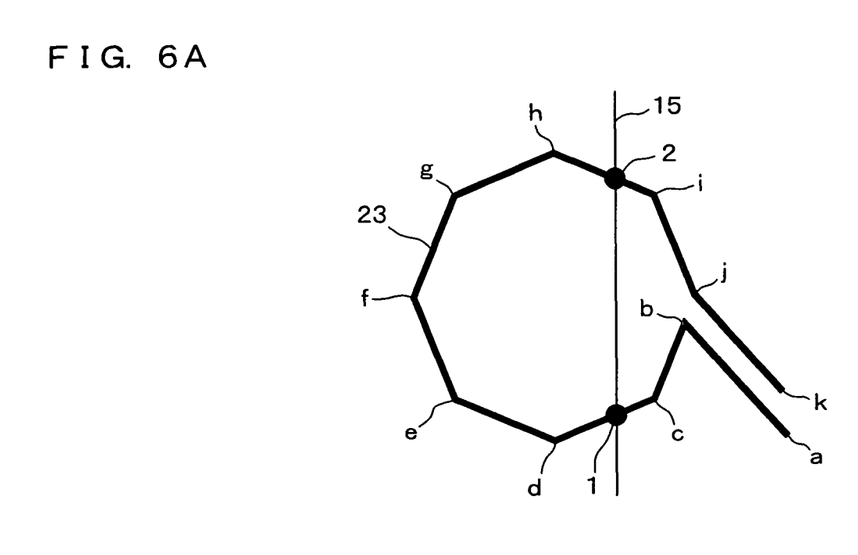
FIG. 6A and FIG. 6B are views depicting a relationship between a coil antenna and a memory array wiring according to Example 3 of the present invention.
Figure 6B:
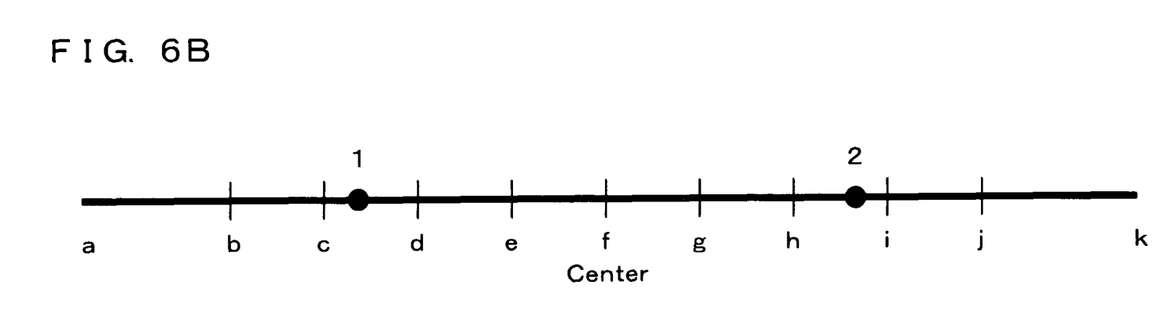

FIG. 6A and FIG. 6B are views depicting a relationship between a coil antenna and a memory array wiring according to Example 3 of the present invention. FIG. 6A is a plan view depicting a relationship between the coil antenna and the memory array wiring, and FIG. 6B is a view depicting the coil antenna when extended. Reference signs a, b, c, d, e, f, g, h, i, j, k, 1, and 2 of FIG. 6A and reference signs a, b, c, d, e, f, g, h, i, j, k, 1, and 2 of FIG. 6B indicate corresponding positions of a coil 23. The present example shows a case where the coil was formed in an octagonal shape. Because intersections 1 and 2 between the bit line 15 and the coil 23 are located at a pair of positions that are equal to each other in wiring length from both terminals of the coil 23, interference noise from the bit line 15 with respect to the coil 23 results in the same phase and same amplitude of noise at both ends of the coil 23, and this noise can be eliminated by a differential amplifier.

Figure 8A:
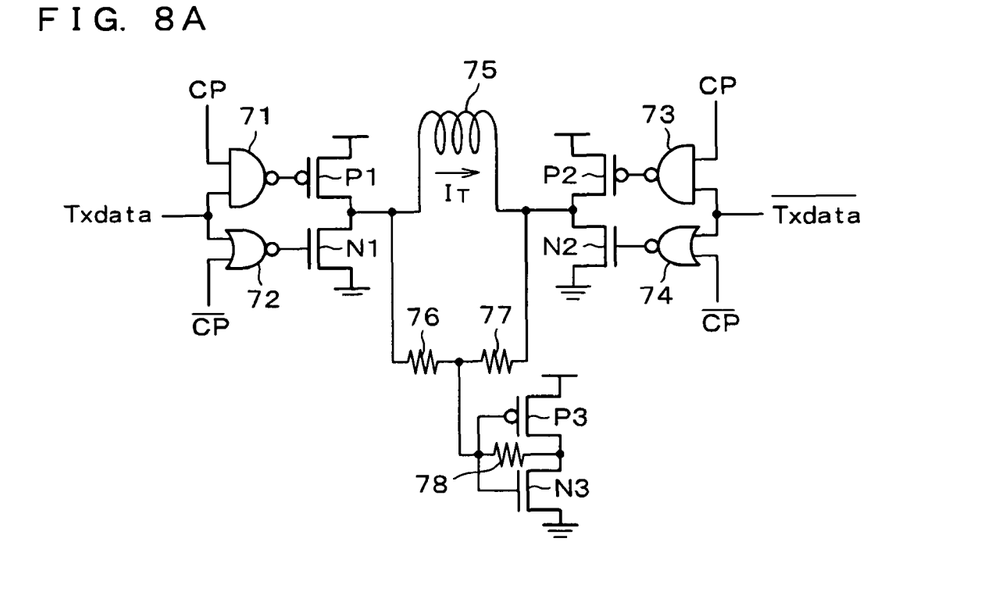
FIG. 8A, FIG. 8B, and FIG. 8C are views depicting a configuration of a transmitter according to the present invention.
Figure 8B:
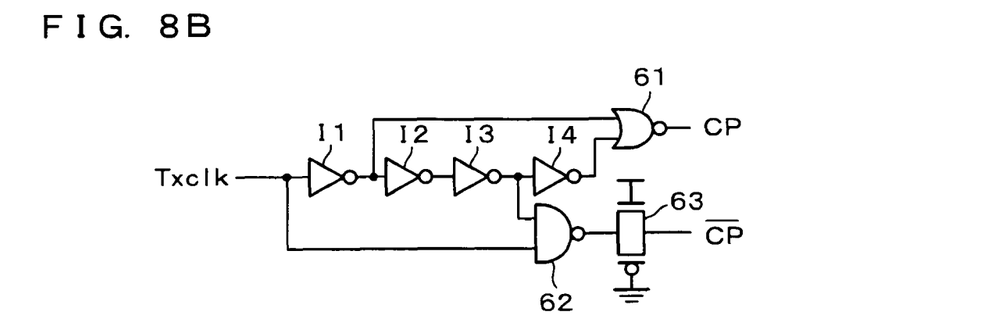
Figure 8C:
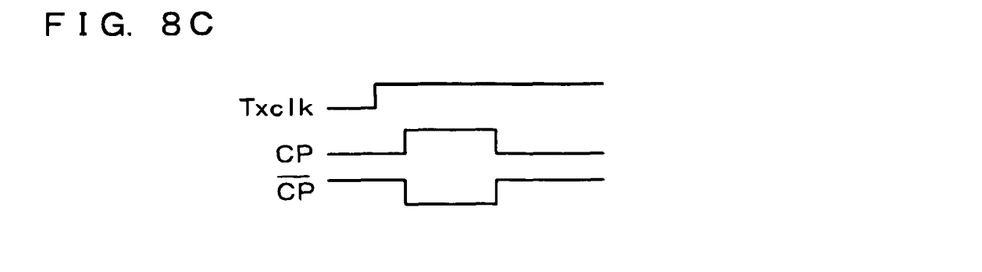
Figures 9A, 9B:
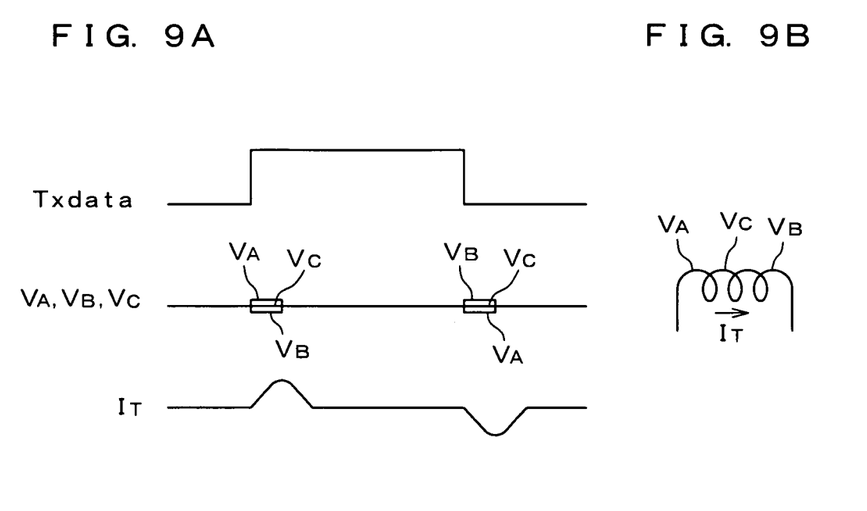
FIG. 9A and FIG. 9B are views depicting waveforms of respective portions of a transmitter according to the present invention.

FIG. 8A, FIG. 8B, and FIG. 8C are views depicting a configuration of a transmitter according to the present invention. FIG. 9A and FIG. 9B are views depicting waveforms of respective portions of a transmitter according to the present invention. Here, description will be given of the configuration of a transmitter that drives a coil antenna as a transmitter coil. The transmitter is composed of NANDs 71 and 73, NORs 72 and 74, resistors 76, 77, and 78, and transistors P1 to P3 and N1 to N3. The NANDs 71 and 73, the NORs 72 and 74, and the transistors P1, P2, N1, and N2 are a coil driver circuit to drive a transmitter coil 75, and the resistors 76, 77, and 78 and the transistors P3 and N3 are a potential holding circuit that attempts to hold the transmitter coil 75 at an intermediate potential between VDD and VSS determined by a ratio of on-resistance between the transistor P3 and the transistor N3. A signal CP is prepared from a clock Txclk by a circuit shown in FIG. 8B, and a waveform thereof is shown in FIG. 8C. The circuit shown in FIG. 8B is composed of a NOR 61, a NAND 62, a buffer 63, and inverters I1 to I4. When the signal CP is 'Low', the transistors P1 to P3 and N1 to N3 are off regardless of transmission data Txdata, current does not flow to the transmitter coil 75, and the transmitter coil 75 is held at a predetermined potential by the potential holding circuit. When the signal CP synchronous with the clock Txclk is 'High', current flows to the transmitter coil 75 in accordance with the transmission data Txdata. When the transmission data Txdata is 'High', the transistors P1 and N2 are on, the transistors P2 and N1 are off, a current IT flows to the transmitter coil 75, and at this time, the potential at respective portions of the transmitter coil 75 becomes VA, VB, and VC, which are intermediate potentials between VDD and VSS determined by a ratio of on-resistance between the transistor P1 and the transistor N2. In actuality, these potentials VA, VB, and VC are almost equal. In addition, when the transmission data Txdata is 'Low', the transistors P2 and N1 are on, the transistors P1 and N2 are off, a current-IT flows to the transmitter coil 75, and potential of the transmitter coil 75 becomes VA, VB, and VC, which are intermediate potentials between VDD and VSS determined by a ratio of on-resistance between the transistor P2 and the transistor N1. Accordingly, when the size of each transistor is designed so that the ratio of on-resistance between the transistors P1 and N2, the ratio of on-resistance between the transistors P2 and N1, and the ratio of on-resistance between the transistors P3 and N3 become equal, a potential to be output by the potential holding circuit and a potential that the transmitter drives the transmitter coil 75 in accordance with change of the transmission data Txdata while the signal CP keeps 'High' become almost equal. Because the potential holding circuit attempts to hold the transmitter coil 75 at a predetermined potential, potential of the transmitter coil 75 does not greatly change even when current flows to the transmitter coil 75. With regard to output of the potential holding circuit, the same effects can be obtained even when this is connected to a center of the transmitter coil 75 via a resistor.

Figure 10A:
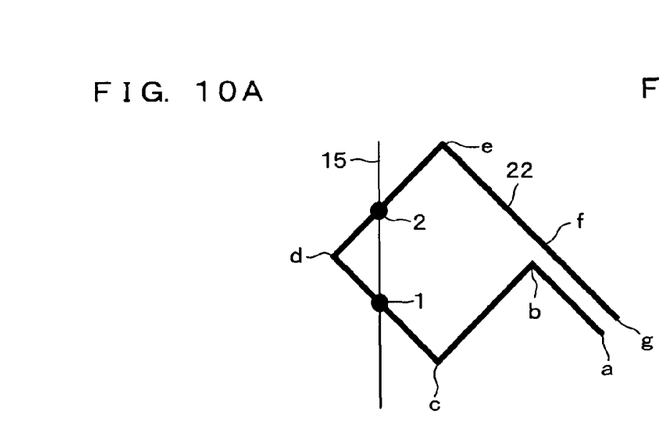
FIG. 10A, FIG. 10B, FIG. 10C, and FIG. 10D are views describing the effects of the present invention.
Figure 10B:
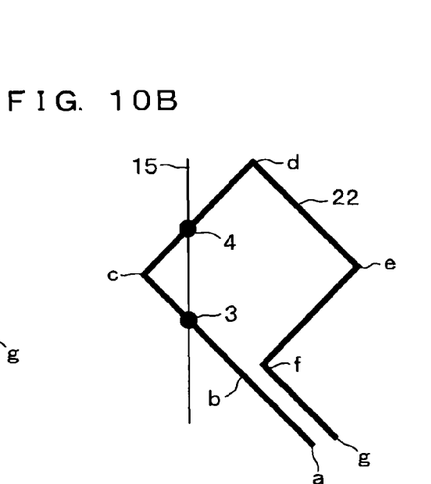
Figure 10C:
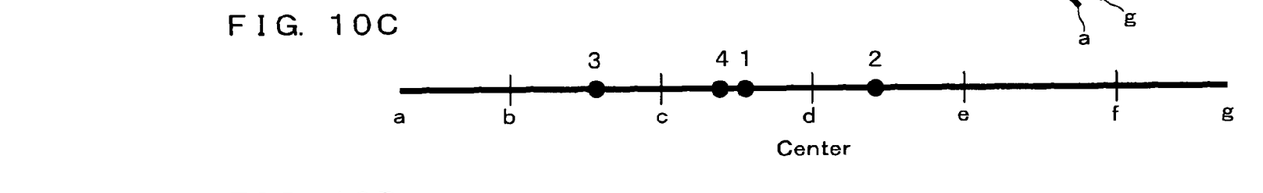
Figure 10D:
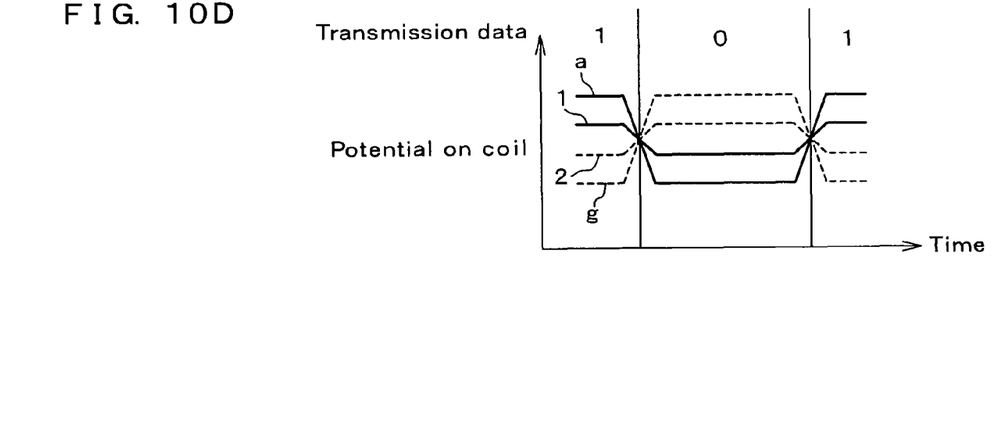

FIG. 10A, FIG. 10B, FIG. 10C, and FIG. 10D are views describing the effects of the present invention. FIG. 10A is a plan view depicting a relationship between the coil antenna and the memory array wiring according to the present invention, FIG. 10B is a plan view depicting a relationship between the coil antenna and the memory array wiring not according to the present invention, FIG. 10C is a view depicting the coil antenna when extended, and FIG. 10D is a view depicting potential on the coil antenna. Reference signs a, b, c, d, e, f, g, 1, and 2 of FIG. 10A, reference signs a, b, c, d, e, f, g, 3, and 4 of FIG. 10B, and reference signs a, b, c, d, e, f, g, 1, 2, 3, and 4 of FIG. 10C indicate corresponding positions of a coil 22. In FIG. 10D, only a time slot where the coil antenna is changed in potential is shown in an enlarged manner. In the case not according to the present invention (FIG. 10B), because intersections 3 and 4 between the bit line 15 and the coil 22 are not located at a pair of positions that are equal to each other in wiring length from both terminals of the coil 22, the potentials of the coil 22 at the intersections 3 and 4 are disproportionately displaced, and receive interference from the coil 22. On the other hand, in the case of the present invention (FIG. 10A), because intersections 1 and 2 are located at a pair of positions that are equal to each other in wiring length from both terminals of the coil 22, the potentials of the coil 22 at the intersections 1 and 2 are changed symmetrical to each other, that is, displaced by the amounts equal in opposite directions, with respect to a predetermined potential, as shown in FIG. 10D, and thus these are canceled out in the bit line 15 to receive no interference from the coil 22.

Figure 11A:
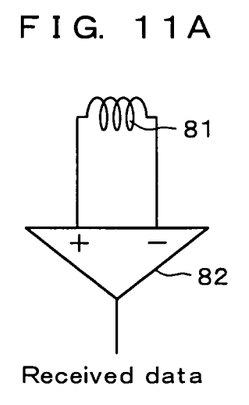
FIG. 11A, FIG. 11B, and FIG. 11C are views depicting a configuration of a receiver according to the present invention.
Figure 11B:
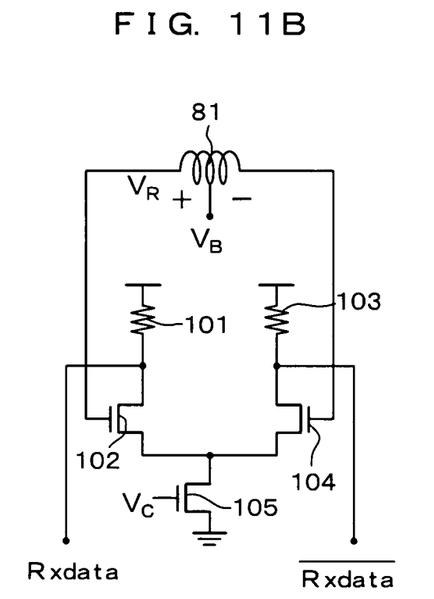
Figure 11C:
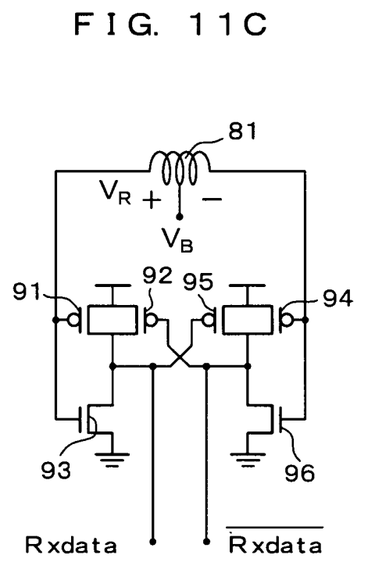

FIG. 11A, FIG. 11B, and FIG. 11C are views depicting a configuration of a receiver according to the present invention. Here, description will be given of a configuration of a receiver that receives a signal using a coil antenna as a receiver coil. FIG. 11A depicts a receiver being a differential amplifier 82 to be connected to a receiver coil 81. Accordingly, same-phase noise to be equally applied to both terminals of the receiver coil 81 can be eliminated, so that the present invention can be suitably carried out.

FIG. 11b depicts a more detailed configuration of a receiver. The receiver is connected to a receiver coil 81, is composed of transistors 102, 104, and 105, and resistors 101 and 103, forms a differential amplifier in its entirety, and outputs a received signal (Rxdata) and bar (Rxdata). The transistors 102 and 104 constitute a differential pair of the differential amplifier, and receive signals from the receiver coil 81. A center of the receiver coil 81, which is connected to the transistors 102 and 104, is connected to a bias voltage VB. Thereby, a center voltage of voltage amplitude occurring at both ends of the receiver coil 81 when receiving signals can be made into a voltage value VB optimized for signal amplification. The source terminals of the transistors 102 and 104 are connected to a transistor 105 for generation of a tail current source, and the source terminal of the transistor 105 is grounded, and a bias voltage VC is input to the gate terminal. The drain sides of the transistors 102 and 104 are connected to power supplies via the resistors 101 and 103.

FIG. 11C depicts a configuration of an example of another receiver. The receiver forms a hysteresis comparator, which is composed of a gain circuit and a latch circuit. The gain circuit is inverters composed of 'a transistor 91 and a transistor 93' and 'a transistor 94 and a transistor 96,' which connect both terminals of the receiver coil 81 to the gates to amplify a pulse voltage VR input. A received signal Rxdata is inverted when the pulse voltage VR exceeds a certain threshold value. The latch circuit is cross-coupled PMOS transistors 92 and 95 connected to the output of the inverters. This circuit has a function of holding the received signal Rxdata, thereby enabling correctly restoring digital data from the pulse voltage VR. This latch circuit changes the threshold value of an input inverter according to the holding data. In the initial state, the latch circuit that holds a low received signal Rxdata raises the threshold value of the inverter. The received signal Rxdata is inverted to be 'High' when a positive pulse is input to the input and exceeds this threshold value. The latch circuit now reduces the threshold value of the inverter, and holds the received signal Rxdata until a negative pulse voltage exceeding the threshold value is input next. Repeating this allows correctly restoring digital data from the positive and negative pulse voltages.

The present invention is not limited to the above-described embodiments.

Figure 12A:
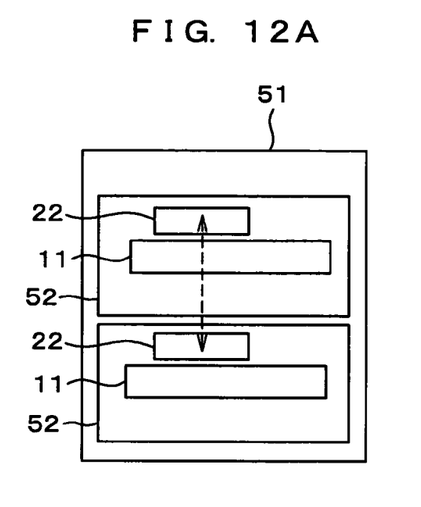
FIG. 12A, FIG. 12B, FIG. 12C, and FIG. 12D are views depicting application examples of the present invention.
Figure 12B:
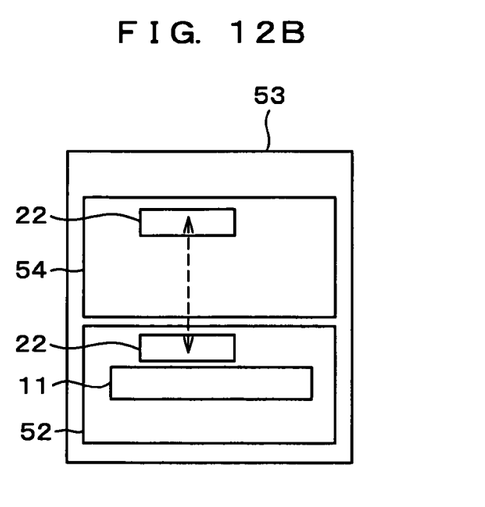
Figure 12C:
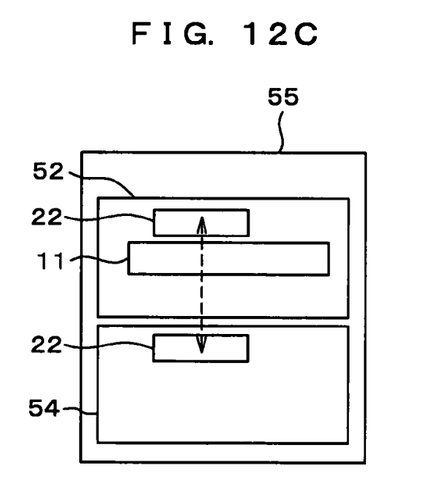
Figure 12D:
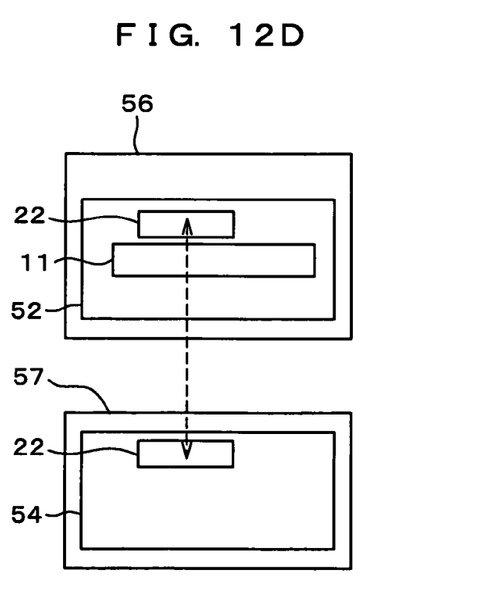

FIG. 12A, FIG. 12B, FIG. 12C, and FIG. 12D are views depicting application examples of the present invention. FIG. 12A depicts the most typical application example, which is an example of an LSI 51 for which a plurality of chips 52 each having a memory array 11 and a coil 22 are stacked and mounted. Here, the figure depicts a schematic illustration, and other chips may be stacked and mounted in actuality. FIG. 12B depicts an example of an LSI 53 for which a chip 54 having a coil 22 is stacked and mounted on a chip 52 having a memory array 11 and a coil 22. FIG. 12C, on the other hand, depicts an example of an LSI 55 for which a chip 52 having a memory array 11 and a coil 22 is stacked and mounted on a chip 54 having a coil 22. FIG. 12D depicts an example of a combination of an LSI 56 having a memory array 11 and a coil 22 and an LSI 57 having a coil 22, where the LSIs mutually carry out communications by inductive coupling.

Although in the above-described examples, examples where the coil as a whole is formed being overlapped with the memory array region have been shown, there may be cases where the coil is partially overlapped with the memory array region.

Providing the coil with a large opening allows carrying out communications even when there is a slight misalignment in the stacking position between chips and coil openings are therefore mutually slightly misaligned in the stacking position.

The memory may be a read-only memory, or may be a writable memory.

The antenna may not only be used for communications within the present electronic circuit, but also be used for communications with another electronic circuit.

Although in the above-described examples, examples where the metal wiring layer that forms bit lines is adjacent to the metal wiring layer that forms coils, and interference therebetween causes a problem have been shown, the present invention can be suitably applied also to a case where the metal wiring layer that forms word lines is adjacent to the metal wiring layer that forms coils, and interference therebetween causes a problem, and which is within the scope of the present invention.

The transmitter/receiver may be a transmitter or a receiver. More specifically, there can be cases where the coil is connected to a transmitter/receiver and shared for transmission and reception, the coil is connected to a transmitter and used as a transmitter coil, and the coil is connected to a receiver and used as a receiver coil, and any of these are within the scope of the present invention. The coil includes any of the cases being for transmission, for reception, and for transmission and reception.

The disclosure of Japanese Patent Application No. 2008-333107, filed on Dec. 26, 2008 including its specification, claims and drawings, is incorporated herein by reference in its entirety.

All the publications, patents and patent applications cited in the present specification are incorporated in the present specification by reference in their entirety.

REFERENCE SIGNS LIST 11, 31 Memory array
12, 13 Peripheral circuit
14 Word line
15 Bit line
16 Memory cell
21 Transmitter/receiver
22, 23, 24 Coil
41 Semiconductor substrate
42, 43, 44 Metal wiring layer
45 Logic circuit
52, 54 Chip
51, 53, 55, 56, 57 LSI
63 Buffer
62, 71, 73 NAND
61, 72, 74 NOR
75 Transmitter coil
76, 77, 78 Resistor
81 Receiver coil
82 Differential amplifier
91, 92, 93, 94, 95, 96, 102, 104, 105 Transistor
I1, I2, I3, I4 Inverter
P1, P2, P3, N1, N2, N3 Transistor

The invention claimed is:

1. An electronic circuit including, on a substrate, a memory array for storing information, and a coil antenna formed by a metal wiring layer being overlapped with a region where said memory array exists, wherein
   positions where a wiring formed by a metal wiring layer adjacent to the metal wiring layer that forms the coil antenna thereover or thereunder and the coil antenna intersect with each other on a plan view consist of a pair of positions that are equal to each other in wiring length from both terminals of the coil antenna.

2. The electronic circuit according to claim 1, wherein the wiring that intersects with the coil antenna is a bit line, word line, or column selecting line of the memory array.

3. The electronic circuit according to claim 1, wherein a differential amplifier that amplifies a signal received by said coil antenna is connected to the coil antenna.

4. The electronic circuit according to claim 1, comprising a transmitter that is connected to the coil antenna, and drives a current flowing to said coil antenna in accordance with transmission data while holding potential at a center of said coil antenna at a predetermined potential.

5. The electronic circuit according to claim 2, wherein a differential amplifier that amplifies a signal received by said coil antenna is connected to the coil antenna.

6. The electronic circuit according to claim 2, comprising a transmitter that is connected to the coil antenna, and drives a current flowing to said coil antenna in accordance with transmission data while holding potential at a center of said coil antenna at a predetermined potential.

7. The electronic circuit according to claim 5, comprising a transmitter that is connected to the coil antenna, and drives a current flowing to said coil antenna in accordance with transmission data while holding potential at a center of said coil antenna at a predetermined potential.

* * * * *